(12) United States Patent
Tan et al.

(10) Patent No.: US 11,619,415 B2
(45) Date of Patent: Apr. 4, 2023

(54) INTELLIGENT PLUG FOR CONTROLLING AN AIR CONDITIONER SYSTEM OVER A PLC NETWORK

(71) Applicant: GREE ELECTRIC APPLIANCES, INC. OF ZHUHAI, Guangdong (CN)

(72) Inventors: Jianming Tan, Zhuhai (CN); Dongfeng Lai, Zhuhai (CN); Tieying Ye, Zhuhai (CN); Jie Tang, Zhuhai (CN); Du Yang, Zhuhai (CN); Quanzhou Liu, Zhuhai (CN); Huantao Ye, Zhuhai (CN); Chenjie Li, Zhuhai (CN); Yufa Li, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 234 days.

(21) Appl. No.: 17/047,064

(22) PCT Filed: Dec. 12, 2018

(86) PCT No.: PCT/CN2018/120650
§ 371 (c)(1),
(2) Date: Oct. 12, 2020

(87) PCT Pub. No.: WO2019/196463
PCT Pub. Date: Oct. 17, 2019

(65) Prior Publication Data
US 2021/0199334 A1 Jul. 1, 2021

(30) Foreign Application Priority Data

Apr. 13, 2018 (CN) .......................... 201810332049.5

(51) Int. Cl.
G05B 19/042 (2006.01)
H04B 3/54 (2006.01)
(Continued)

(52) U.S. Cl.
CPC .............. *F24F 11/88* (2018.01); *F24F 11/52* (2018.01); *F24F 11/58* (2018.01); *F24F 11/63* (2018.01);
(Continued)

(58) Field of Classification Search
CPC .. F24F 11/88; F24F 11/52; F24F 11/58; F24F 11/63; F24F 11/50; F24F 11/54;
(Continued)

(56) References Cited

U.S. PATENT DOCUMENTS 9,935,784 B2 * 4/2018 Kotake ................ H04L 61/5038
10,697,659 B2 * 6/2020 Koizumi .................. F24F 11/54
(Continued)

FOREIGN PATENT DOCUMENTS

CN 1538118 A 10/2004
CN 1673639 A 9/2005
(Continued)

OTHER PUBLICATIONS

Extended European Search Report for European Application No. 18914181.5 dated May 7, 2021 (10 pages).

*Primary Examiner* — Darrin D Dunn
(74) *Attorney, Agent, or Firm* — J. Miguel Hernandez; James R. Gourley; Carstens, Allen & Gourley, LLP

(57) ABSTRACT

A controller of an air-conditioning unit, and an air-conditioner. The air-conditioning unit uses a power line carrier communication (PLC) to communicate. The air-conditioning unit includes multiple air-conditioner indoor units and multiple air-conditioner outdoor units. The operation of the air-conditioning unit is controlled by a controller. The controller includes: a plug component configured to be plugged into a socket in a preset PLC communication network and a controller body component connected to the plug component and configured to receive a communication signal from a
(Continued)

target device and transmit the communication signal to a device matching the target device, the target device including one of an air-conditioner indoor unit and an air-conditioner outdoor unit.

18 Claims, 2 Drawing Sheets

(51) Int. Cl.
*F24F 11/88* (2018.01)
*F24F 11/63* (2018.01)
*F24F 11/52* (2018.01)
*F24F 11/58* (2018.01)

(52) U.S. Cl.
CPC .... *G05B 19/042* (2013.01); *G05B 2219/2614* (2013.01); *H04B 3/54* (2013.01)

(58) Field of Classification Search
CPC .. F24F 11/56; F24F 11/62; F24F 11/64; F24F 11/65; F24F 3/065; F24F 11/89; G05B 19/042; G05B 2219/2614; H04B 3/54; H04B 3/56; H04B 2203/5445
See application file for complete search history.

(56) References Cited

U.S. PATENT DOCUMENTS

| | | | |
|---|---|---|---|
| 2006/0026972 A1* | 2/2006 | Masui | F24F 11/30 236/51 |
| 2007/0220907 A1 | 9/2007 | Ehlers | |
| 2008/0186160 A1* | 8/2008 | Kim | F24F 11/38 236/51 |
| 2008/0188989 A1* | 8/2008 | Cha | F24F 11/30 700/277 |
| 2009/0263999 A1* | 10/2009 | Onoue | H01R 13/713 180/65.21 |
| 2011/0298300 A1 | 12/2011 | Gray et al. | |
| 2012/0049639 A1 | 3/2012 | Besore et al. | |
| 2012/0128081 A1* | 5/2012 | Hikihara | H04B 3/54 375/257 |
| 2013/0123992 A1* | 5/2013 | Ishizaka | F24F 11/62 700/277 |
| 2013/0210250 A1* | 8/2013 | Takemura | H04B 3/54 340/10.5 |
| 2014/0177692 A1* | 6/2014 | Yu | H04B 3/46 375/224 |
| 2015/0051739 A1* | 2/2015 | Song | G05B 15/02 700/276 |
| 2016/0156227 A1* | 6/2016 | Nagashima | G01R 21/00 307/131 |
| 2017/0010595 A1* | 1/2017 | Kawaguchi | H02J 13/00034 |

FOREIGN PATENT DOCUMENTS

| | | |
|---|---|---|
| CN | 1854623 A | 11/2006 |
| CN | 101592374 A | 12/2009 |
| CN | 102549346 A | 10/2014 |
| CN | 204795033 U | 11/2015 |
| CN | 105526647 A | 4/2016 |
| CN | 105846858 A | 8/2016 |
| CN | 106067837 A | 11/2016 |
| CN | 108302742 A | 7/2018 |
| CN | 208238150 U | 12/2018 |
| JP | S60186641 A | 9/1985 |
| WO | 2014002132 A1 | 1/2014 |

* cited by examiner

INTELLIGENT PLUG FOR CONTROLLING AN AIR CONDITIONER SYSTEM OVER A PLC NETWORK

CROSS REFERENCE TO RELATED APPLICATION

This application is a U.S. National Stage of International Application No. PCT/CN2018/120650, filed on Dec. 12, 2018, and published as WO 2019/196463 on Oct. 17, 2019, which claims priority to Chinese Patent Application No. 201810332049.5, entitled "Controller of Air-Conditioning Unit, and Air-Conditioner", and filed with the China National Intellectual Property Administration on Apr. 13, 2018. Each application, publication, and patent listed in this paragraph are hereby incorporated by reference in their entireties.

TECHNICAL FIELD

The present disclosure relates to a field of air-conditioning control technology, and particularly to a controller of an air-conditioning unit and an air-conditioner.

BACKGROUND

In related technologies, devices in a multi-split system, such as an outdoor unit, an indoor unit, a wired remote controller and the like, all use a communication mode such as CAN, 485, EMS and so on. In addition, an air-conditioning controller, such as a wired remote controller and a centralized controller, is generally installed and fixed on a wall by a screw.

SUMMARY

Some embodiments of the present disclosure provide a controller of an air-conditioning unit and an air-conditioner, to at least solve technical problems that the controller of the air-conditioning unit needs to be fixed by providing a dedicated installation device when controlling an operation of the air-conditioning unit, and thus the use of the controller is inconvenient, and user experience is reduced.

According to one aspect of embodiments of the present disclosure, a controller of an air-conditioning unit is provided. The air-conditioning unit uses a Power Line Communication (PLC) to communicate; the air-conditioning unit includes a plurality of air-conditioner indoor units and a plurality of air-conditioner outdoor units, an operation of the air-conditioning unit is controlled by the controller, and the controller includes: a plug component configured to be plugged into a socket in a preset PLC communication network; and a controller body component connected to the plug component and configured to receive a communication signal of a target device and transmit the communication signal to a device matching the target device; the target device includes one of an air-conditioner indoor unit and an air-conditioner outdoor unit.

Alternatively, the controller body component includes: a power line communication module configured to receive the communication signal of the target device through a power line; and a processor module connected to the power line communication module and configured to analyze the communication signal to obtain an analysis result; the processor module is further configured to transmit a target control instruction to a target indoor unit or a target outdoor unit through the power line communication module, the target control instruction is configured to control an operation of the target indoor unit or the target outdoor unit.

Alternatively, the controller body component further includes: a display module configured to display operation information and state information of the air-conditioning unit; and a key-press module configured to receive key-press operation information.

Alternatively, the plug component includes at least one of a two-pin plug component and a three-pin plug component.

Alternatively, the plug component is moved to a target position, and the plug component is fixed by a limit module.

Alternatively, the controller includes a wired remote controller, the wired remote controller is configured to acquire, through the PLC communication network, communication information transmitted by an air-conditioner indoor unit or an air-conditioner outdoor unit; the wired remote controller is further configured to transmit a preset control instruction to a target indoor unit or a target outdoor unit, the control instruction is configured to control an operation of the target indoor unit or the target outdoor unit.

Alternatively, the controller further includes a centralized controller and a gateway, the centralized controller is configured to centrally control the plurality of air-conditioner outdoor units and/or the plurality of air-conditioner indoor units to perform a target action according to a control instruction after receiving the control instruction; and the gateway is configured to connect a preset external device to the PLC communication network to control the air-conditioner outdoor units or the air-conditioner indoor units.

Alternatively, the plurality of air-conditioner outdoor units include a central outdoor unit configured to provide a network Internet Protocol (IP) address for each network device in the PLC communication network, the network IP address is configured to identify each network device; the central outdoor unit forwards communication data to a target communication device after receiving the communication data transmitted by an air-conditioner indoor unit or an air-conditioner outdoor unit.

Alternatively, the controller establishes a communication connection between an air-conditioner indoor unit and an air-conditioner outdoor unit connected to a socket in the PLC communication network after being plugged into the socket, to complete communication networking of the socket; after the communication networking is completed, the controller is transferred to a next socket connected to the PLC communication network to maintain normal communication between the air-conditioner indoor unit and the air-conditioner outdoor unit under the PLC communication network.

According to another aspect of embodiments of the present disclosure, an air-conditioner is further provided, which includes the controller of the air-conditioning unit in any one of the above-mentioned embodiments.

In some embodiments of the present disclosure, the controller is directly connected to any socket in the PLC communication network through the plug component. When controlling the air-conditioning unit, the controller is directly plugged into the socket, and a position of the controller is changed optionally. After the position of the controller is changed, the original air-conditioning unit in the PLC network can still be controlled. That is, according to the present disclosure, if an installation position of the controller needs to be changed, it is only needed to unplug the controller and then plug the controller into another socket to control the original air-conditioning unit. In some embodiments of the present disclosure, an operation of the air-conditioner outdoor unit or the air-conditioner indoor unit in the air-conditioning unit is controlled by the controller. In some embodiments, the position of the controller in each socket is flexibly adjusted. After the PLC communication network is established, the operation of the air-conditioning unit is controlled by the air-conditioning controller. The air-conditioning controller is directly plugged into any socket in the PLC communication network by a plug-in mounting mode, without needing a dedicated installation box. Accordingly, the installation position of the controller is changed optionally, and the controller is quickly moved to any place as desire to control the air-conditioning unit. Therefore, the technical problems that the controller of the air-conditioning unit needs to be fixed by providing a dedicated installation device when controlling the operation of the air-conditioning unit, and thus the use of the controller is inconvenient, and user experience is reduced can be solved.

BRIEF DESCRIPTION OF THE DRAWINGS

Accompanying drawings described herein are used for providing a further understanding of the present disclosure and constitute a part of the present disclosure. Exemplary embodiments of the present disclosure and the description thereof are used for explaining the present disclosure, and do not constitute an improper limitation to the present disclosure. In the drawings.

DETAILED DESCRIPTION OF THE EMBODIMENTS

Figure 1:
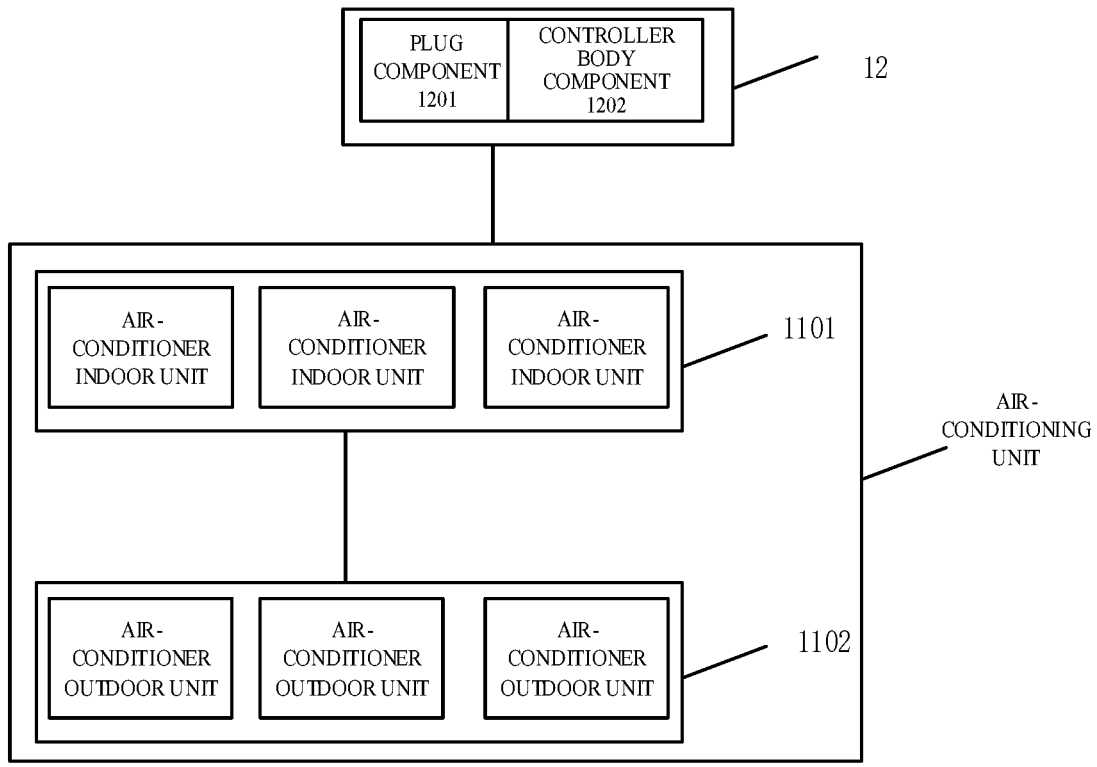
FIG. 1 is a schematic diagram illustrating a controller of an air-conditioning unit according to some embodiments of the present disclosure.

In order to enable those skilled in the art to better understand the solution of the present disclosure, technical solutions in the embodiments of the present disclosure will be described clearly and completely with reference to the accompanying drawings in the embodiments of the present disclosure. Obviously, the described embodiments are only some of the embodiments of the present disclosure, rather than all the embodiments. Based on the embodiments of the present disclosure, all other embodiments obtained by those of ordinary skill in the art without creative work shall fall within the protection scope of the present disclosure.

It should be noted that terms "first" and "second" in the description, claims and the above-mentioned drawings of the present disclosure are used for distinguishing similar objects, but not definitely used for describing a specific sequence or order. It should be understood that data used in this way can be interchanged under appropriate circumstances so that the embodiments of the present disclosure described herein can be implemented in an order other than those illustrated or described herein. In addition, terms "including" and "having" and any variations thereof are intended to cover a non-exclusive inclusion. For example, a process, method, system, product or device that includes a series of steps or unit is not definitely limited to those clearly listed steps or units, and may include other steps or units that are not clearly listed or are inherent to these process, method, product, or device.

In order to facilitate a user to understand the present disclosure, some terms or nouns involved in each embodiment of the present disclosure are explained below.

Power Line Communication (PLC) is a unique communication mode to a power system. The PLC refers to a technology of use of an existing power line to transmit an analog or digital signal at a high speed by means of a carrier wave.

The following embodiments of the present disclosure can be applied to a multi-split air-conditioning system. The multi-split air-conditioning system may include an air-conditioner outdoor unit, an air-conditioner indoor unit, a wire controller and other devices. In related technologies, when an air-conditioning unit is controlled by a controller, it is required to provide a dedicated device or equipment (such as an installation box) for the controller to fix the controller, so as to use the controller. In the present disclosure, the controller is provided to have a plug-in mounting mode. By providing a pin, the controller can be plugged into any socket in the PLC communication network, to make the controller connected to a network of each air-conditioner indoor unit and an air-conditioner outdoor unit. The user can use the air-conditioning controller to control the air-conditioner indoor unit and the air-conditioner outdoor unit in the air-conditioning unit and control an operation state of the air-conditioning unit. When a position of the controller needs to be changed, the controller only needs to be unplugged and plugged into another socket, achieving a purpose of plugging and unplugging.

In some embodiments of the present disclosure, the controller is plugged into the socket to realize an operation control of each device in the air-conditioning unit through the pre-established power line communication (PLC). The controller in the present disclosure can implement the control through the socket, and the air-conditioner indoor unit and the air-conditioner outdoor unit connected to the socket, the transmission of the communication signal is implemented through a power line.

Embodiment 1

FIG. 1 is a schematic diagram illustrating a controller of an air-conditioning unit according to some embodiments of the present disclosure. As shown in FIG. 1, the air-conditioning unit uses the power line communication (PLC) for communication. The air-conditioning unit includes: a plurality of air-conditioner indoor units 1101 and a plurality of air-conditioner outdoor units 1102. Operations of the plurality of air-conditioner indoor units 1101 and the plurality of air-conditioner outdoor units 1102 in the air-conditioning unit are controlled by the controller 12. The controller 12 includes a plug component and a controller body component.

The plug component 1201 is configured to plug into a socket in a preset PLC communication network. In some embodiments, the plug component is directly plugged into any socket in the PLC communication network, without needing to provide a dedicated installation box to install the controller, which reduces a cost of installing the device. Moreover, in some embodiments, an installation position of the controller is changed optionally through the plug-in mounting mode, i.e., only the plug component 1201 is utilized to change the position of the controller without moving the installation box of the controller, accordingly the controller is quickly moved to a target position.

Alternatively, in some embodiments, the plug component includes at least one of the following: a two-pin plug component and a three-pin plug component. The plug component of the present disclosure can be applied to various sockets, and not only satisfies a two-pin power socket, but also satisfies a three-pin power socket, and thus has a wider application range.

In some embodiments, the plug component is moved optionally, such as being moved up and down. When the controller needs to be moved to the target position, the controller is manually moved to the target position. After the plug component is moved to the target position, the plug component is fixed by a limit module. The plug component in the embodiments of the present disclosure can be applied to different jacks of the socket, such as a two-pin jack or a three-pin jack, such that the air-conditioning controller can maintains practicality after being plugged into the socket. The controller in the embodiments of the present disclosure is moved up and down. For example, if the jack of the socket is in an upper position, the plug component of the air-conditioning controller is moved up to the target position and then plugged into the socket. If the jack of the socket is in a lower position, the plug component of the controller is moved down to the target position and then plugged into the socket. In this way, the controller is kept in a nice position.

The controller body component 1202 is connected to the plug component, and is configured to receive a communication signal of a target device and transmit the communication signal to a device matching the target device. The target device includes one of the air-conditioner indoor unit and the air-conditioner outdoor unit.

In some embodiments, the above-mentioned controller body component 1202 is used as a main component of a controller to control the operation of the air-conditioning unit. After the controller is moved to the target socket by using the plug component and the controller is plugged into the socket, the operations of the air-conditioner indoor unit and the air-conditioner outdoor unit in the air-conditioning unit are controlled through the pre-established PLC communication network. That is, the operation of the air-conditioner indoor unit or the air-conditioner outdoor unit is controlled by the controller 12.

In some embodiments, when controlling the air-conditioning unit, the above-mentioned air-conditioning controller is directly plugged into the socket, and the position of the controller is moved optionally. If another air-conditioning unit needs to be controlled, the controller is plugged into a next socket to implement a control of another air-conditioning unit. In some embodiments of the present disclosure, the operation of the air-conditioner outdoor unit or the air-conditioner indoor unit in the air-conditioning unit is controlled by the controller. In some embodiments, after the position of the controller is changed, the original air-conditioning unit in the PLC network is also controlled. That is, according to the present disclosure, if the installation position of the controller needs to be changed, it is only needed to unplug the controller and plug it into another socket to control the original air-conditioning unit, accordingly the position of the controller in each socket is flexibly adjusted. After the PLC communication network is established, the operation of the air-conditioning unit is controlled by the air-conditioning controller, and the air-conditioning controller is directly plugged into any socket in the PLC communication network through a plug-in mounting mode, without needing a dedicated installation box. In some embodiment, the installation position of the controller is changed optionally, and the controller is moved to any place as desire to control the air conditioning, thereby solving the technical problem that a dedicated installation device needs to be provided to fix the controller when the controller of the air-conditioning unit controls the operation of the air-conditioning unit, causing inconvenient use of the controller and reduced user experience.

Alternatively, the above-mentioned controller body component includes: a power line communication module which receives a communication signal of a target device through a power line; and a processor module connected to the power line communication module and configured to analyze the communication signal and obtain an analysis result. Alternatively, the processor module is further configured to transmit a target control instruction to a target indoor unit or a target outdoor unit through the power line communication module. The target control instruction is configured to control an operation of the target indoor unit or the target outdoor unit. That is, in some embodiments, the analysis of the communication signal is implemented by the processor module i.e., corresponding communication information is received. Moreover, the processor module used as a control body transmits a corresponding control instruction to other air-conditioning devices, for example, a control instruction is transmitted to the target indoor unit or the target outdoor unit through the communication module.

In addition to the power line communication module, the processor module and the like, the above-mentioned controller body component may further include a display module and a key-press module. The display module is configured to display operation information and state information of the air-conditioning unit. The key-press module receives key-press operation information. That is, in some embodiments, a current operation condition of the air-conditioning unit is displayed through the display module, and the user can know the current state of the air-conditioning unit through the display module.

Alternatively, in some embodiments, the processor module is not only connected to the above-mentioned power line communication module to receive and analyze the communication signal of the communication module, but also is connected to the display module and the key-press module. The processor module controls the display module to display a content to be displayed (that is, the operation information and state information of the above-mentioned air-conditioning unit). At the same time, the processor also receives and processes the key-press operation information transmitted by the key-press module, and perform a corresponding action according to the key-press operation information. In some embodiments, the key-press operation information transmitted by the key-press module is also a control instruction, and operations of other air-conditioning devices (such as air-conditioner indoor unit or air-conditioner outdoor unit) are controlled by the control instruction.

In some embodiments, controls of the air-conditioner indoor unit and the air-conditioner outdoor unit in the air-conditioning unit are implemented through various modules in the above-mentioned controller body component. Moreover, when the communication information or the control instruction corresponding to the key-press operation performed by the key-press module is received, corresponding information is processed by the processor module, and then information is transmitted to a corresponding target communication device.

It should be noted that there are a plurality of types of controllers in the embodiments of the present disclosure, as long as a module configured to control the air-conditioning unit is used as one controller. For example, in some embodiments, the controller is a wired remote controller, and the wired remote controller acquires the communication information transmitted by the air-conditioner indoor unit or the air-conditioner outdoor unit through the PLC communication network. In addition, in some embodiments, the wired remote controller used as the control body also transmits the control instruction to the target device (i.e., the above-mentioned air-conditioner indoor unit or the air-conditioner outdoor unit). Accordingly, the control of the air-conditioner indoor unit or the air-conditioner outdoor unit is implemented through the wired remote controller, and a normal operation of the air-conditioning unit is implemented.

Alternatively, the control instruction transmitted by the wired remote controller and the target control instruction transmitted by the processor module in the embodiments of the present disclosure mentioned above may both be used as a control mode, and a content of the control instruction is not limited.

In addition, a type of the controller may also include a centralized controller and a gateway. The centralized controller is configured to centrally control the plurality of air-conditioner outdoor units and the plurality of air-conditioner indoor units, or the plurality of air-conditioner outdoor units or the plurality of air-conditioner indoor units to perform a target action according to a control instruction after the control instruction is received. The gateway is configured to connect a preset external device to the PLC communication network to control the air-conditioner outdoor unit or the air-conditioner indoor unit. In some embodiments, the control of each air-conditioner indoor unit or air-conditioner outdoor unit is implemented by the centralized controller, and the normal operation of the air-conditioning unit is also implemented. The air-conditioning unit is connected to the external device by using the gateway. The user can transmit the control instruction through the external device so as to implement the control of the air-conditioner indoor unit and the air-conditioner outdoor unit. In some embodiments, the gateway is used as a communication interface to exchange communication data.

Alternatively, the plurality of air-conditioner outdoor units may include one central outdoor unit which is configured to provide a network Internet Protocol (IP) address for each network device in the PLC communication network. The network IP address is configured to identify each network device. After receiving the communication data transmitted by the air-conditioner outdoor unit or the air-conditioner indoor unit, the central outdoor unit forwards the communication data to a target communication device.

The central outdoor unit in the above-mentioned embodiments provides a network IP address for each network device in the PLC communication network. A plurality of types of devices, such as a plurality of air-conditioner outdoor units, a plurality of air-conditioner indoor units, a plurality of wired remote controllers, a centralized controller, a gateway or the like, may be included in the PLC communication network in the embodiments of the present disclosure. In some embodiments, all these devices are connected to the power line to perform the PLC network communication. In some embodiments, each device has an independent Media Access Control (MAC) address, and all devices form a PLC communication multi-split system network through a PLC networking mechanism. The central outdoor unit is used as a communication main body, and as a main body of a connection (central outdoor unit) to receive the information transmitted by the preset device (the air-conditioner outdoor unit, the air-conditioner indoor unit, the plurality of wired remote controllers, the centralized controller and the gateway), and transmit the information transmitted by the preset device to the target device.

In some embodiments, after the controller is plugged into one socket in the PLC communication network, the transmission of the communication information is implemented through a pre-established PLC communication connection between the air-conditioner indoor unit and the air-conditioner outdoor unit, and then the operation of the air-conditioning unit is controlled by the controller. When needed, the controller is unplugged and plugged into the next socket, in such a way, the normal communication between the original air-conditioner indoor unit and air-conditioner outdoor unit in the PLC communication network is maintained. That is, in some embodiments, the control of the air-conditioner indoor unit or the air-conditioner outdoor unit is implemented through the controller.

In the embodiments of the present disclosure, the controller is moved arbitrarily. It is only needed to directly plug the air-conditioning controller into the socket in a room through the plug component, the controls of the operations of the air-conditioner indoor unit and the air-conditioner outdoor unit in the PLC communication network are implemented. The air-conditioning controller can also be moved to another socket optionally, and can still control the air-conditioning unit in the PLC communication.

Embodiment 2

Figure 2:
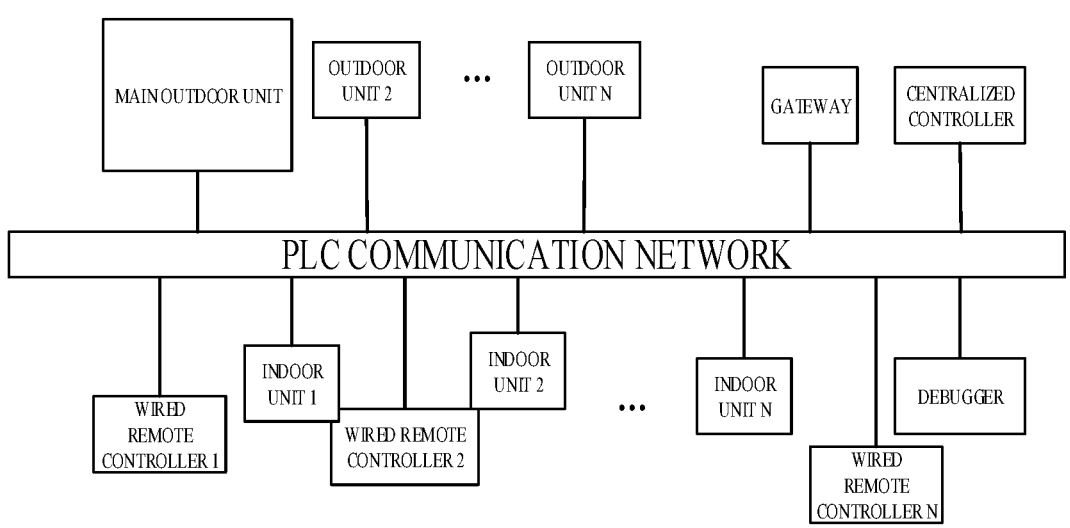
FIG. 2 is a schematic diagram illustrating a networking system of an air-conditioning unit according to some embodiments of the present disclosure.

FIG. 2 is a schematic diagram illustrating a networking system of an air-conditioning unit according to some embodiments of the present disclosure. As shown in FIG. 2, the networking system can be a PLC communication network, which connects a plurality of indoor units, such as an indoor unit 1, an indoor unit 2, an indoor unit 3, . . . , and an indoor unit N as shown in FIG. 2. Moreover, in some embodiments, the PLC communication network directly connects the wired remote controllers which includes a wired remote controller 1, a wired remote controller 2, . . . , a wired remote controller N and so on. In some embodiments, the PLC communication network also connects a debugger, a centralized controller and a gateway.

Alternatively, in some embodiments, the aforementioned PLC communication network connects a plurality of outdoor units including a main outdoor unit, an outdoor unit 2, . . . , and an outdoor unit N. A control signal is transmitted by the main outdoor unit. Moreover, the present disclosure can implement a connection of the centralized controller, the debugger or the gateway or the like without a communication line. The main outdoor unit may include a PLC modulation device of the PLC network communication. The PLC modulation device, used as a central coordinator CC0 of the entire PLC network, can make all devices in the PLC network receive and transmit data through the power line. Moreover, if a certain device needs to transmit data to a specific target device, the device firstly transmits the data, and after the data is received by the CC0 (i.e., the outdoor unit), the CC0 forwards the data to a corresponding target device, and the target device performs a corresponding action after receiving the data from the CC0.

Figure 3A:
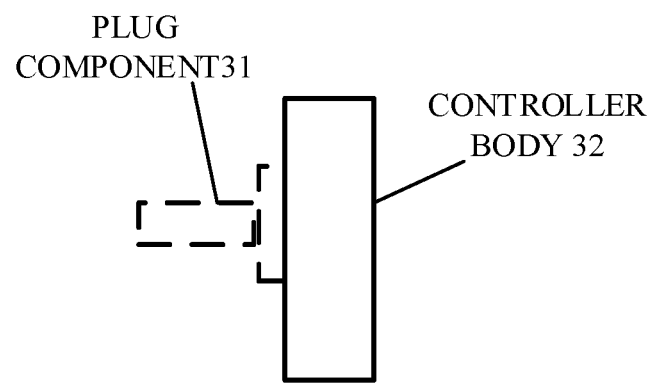
FIG. 3a is a schematic side view illustrating a two-pin plug-in structure of an air-conditioning controller according to some embodiments of the present disclosure.
Figure 3B:
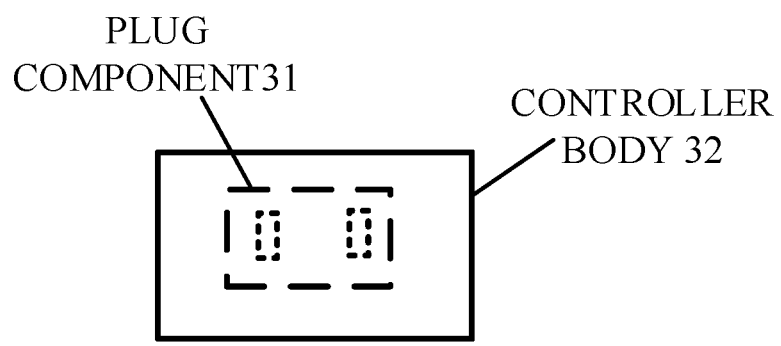
FIG. 3b is a schematic back view of a two-pin plug-in structure of an air-conditioning controller according to some embodiments of the present disclosure.

The wired remote controller, the centralized controller, the gateway or the like in the networking system in the embodiments of the present disclosure can all be used as the air-conditioning controller. There are a plurality of types of air-conditioning controllers in the present disclosure, and the present disclosure does not limit a specific type of air-conditioning controller. FIG. 3a is a schematic side view illustrating a two-pin plug-in structure of an air-conditioning controller according to some embodiments of the present disclosure. As shown in FIG. 3a, the plug component 31 is on the left and the controller body 32 is on the right. FIG. 3b is a schematic back view illustrating a two-pin plug-in structure of an air-conditioning controller according to some embodiments of the present disclosure. As shown in FIG. 3b, a middle portion is the plug component 31, and an outer portion is the controller body 32.

Alternatively, in the contents shown in FIGS. 3a and 3b, the controller body may include a Microprogrammed Control Unit (MCU), a display module, a key-press module, a power line communication module, and a power conversion module. In some embodiments, the plug component includes two metal pins. Of course, the plug component in the embodiments of the present disclosure is also a three-pin plug component to apply to different sockets.

The air-conditioning controller has a plug component. Through the plug component, it is only needed to directly plug the air-conditioning controller into the socket in the room to participate in the networking and communicate with other devices in the network. After the networking is completed, the air-conditioning controller can be optionally moved to other sockets connected to the original PLC network, and can still communicate with the other devices normally.

Alternatively, in some embodiments of the present disclosure, the plug component of the air-conditioning controller is moved up and down, and is limited and fixed after being moved to a desired position in order to meet different jack positions in different sockets, so that after being plugged into the socket, the air-conditioning controller is kept centered with the socket, which is more beautiful. For example, in some embodiments, if the jack of the socket is in an upper position, the plug component of the air-conditioning controller is moved up to an appropriate position, and then plugged into the socket; if the jack of the socket is in a lower position, the plug component of the air-conditioning controller is moved down to an appropriate position and then plugged into the socket.

According to another aspect of some embodiments of the present disclosure, an air-conditioner is further provided, which includes the controller of the air-conditioning unit described in any of the above embodiments.

Sequence numbers of the embodiments of the present disclosure mentioned above are merely used for description and do not represent advantages and disadvantages of the embodiments.

In the embodiments of the present disclosure mentioned above, descriptions of various embodiments are emphasized respectively, and parts which are not elaborated in detail in a certain embodiment may refer to relevant descriptions of other embodiments.

In several embodiments provided by the present disclosure, it should be understood that the disclosed technical contents are also implemented in other modes. The device embodiments described above are merely illustrative. For example, the division of units may be a logical function division. In actual implementation, there may be another division mode, for example, in some embodiments, a plurality of units or assemblies are combined or integrated into another system, or some features may be ignored or not performed. In addition, coupling or direct coupling or communication connection between each other displayed or discussed may be indirect coupling or communication connection between the units or modules through some interfaces, and may be electrical or other forms.

The units described as separate components may be or may not be physically separated, and the components displayed as units may be or may not be physical units, that is, may be located in one place, or may be distributed in multiple units. Some or all of the units can be selected according to actual requirements to implement the solution of the present disclosure.

In addition, each functional unit in each embodiment of the present disclosure may be integrated into one processing unit, or each unit may exist physically separately, or two or more units may be integrated into one unit. The above-mentioned integrated unit can be implemented in a form of hardware or in a form of a software functional unit.

The integrated unit can be stored in a computer-readable storage medium when being implemented in the form of a software function unit and sold or used as an independent product. Based on such understanding, the technical solution of the present disclosure can be implemented in the form of a software product in essence, or a part of the technical solution contributing to the prior art or all or part of the technical solution can be implemented in the form of a software product. The computer software product is stored in a storage medium, and includes multiple instructions to make a computer device (which may be a personal computer, a server, or a network device and the like) implement all or part of the steps of the method described in various embodiments of the present disclosure. The abovementioned storage medium includes: various media capable of storing a program code, such as a U disk, a Read-Only Memory (ROM), a Random Access Memory (RAM), a mobile hard disk, a magnetic disk or an optical disc, etc.

The above are some embodiments of the present disclosure. It should be pointed out that those of ordinary skill in the art can also make some improvements and modifications without departing from the principle of the present disclosure, and these improvements and modifications should fall within the scope of protection of the present disclosure.

INDUSTRIAL APPLICABILITY

The solution provided by the embodiments of the present disclosure can be applied to the controller of the air-conditioning unit to directly connect the plug component to any socket in the PLC communication network. In the technical solution provided by the embodiments of the present disclosure, after the PLC communication network is established, the operation of the air-conditioning unit is controlled by the air-conditioning controller. The air-conditioning controller is directly plugged into any socket in the PLC communication network by the plug-in mounting mode, without needing a dedicated installation box. The installation position of the controller can be changed optionally, and the controller can be moved to any place as desire to control the air condition. Thereby, the problem that the controller of the air-conditioning unit needs to be fixed by providing a dedicated installation device when controlling the operation of the air-conditioning unit, and thus the use of the controller is inconvenient, and user experience is reduced can be solved.

What is claimed is:
1. A controller of an air-conditioning unit, the air-conditioning unit using a Power line Communication (PLC) to communicate, the air-conditioning unit comprising a plurality of air-conditioner indoor units and a plurality of air- conditioner outdoor units, an operation of the air-conditioning unit being controlled by the controller, and the controller comprising:
a plug component, configured to be plugged into a socket in a preset PLC communication network; and
a controller body component, connected to and arranged on the plug component and configured to receive a communication signal of a target device and transmit the communication signal to a device matching the target device; wherein the target device comprises one of an air-conditioner indoor unit and an air-conditioner outdoor unit;
wherein the controller establishes a communication connection with an air-conditioner indoor unit and an air-conditioner outdoor unit connected to a socket in the PLC communication network after being plugged into the socket, to complete communication networking of the controller; after the communication networking is completed, the controller is transferred to a next socket connected to the PLC communication network to maintain normal communication between the air-conditioner indoor unit and the air-conditioner outdoor unit under the PLC communication network.

2. The controller according to claim 1, wherein the controller body component comprises:
a power line communication receiver, configured to receive the communication signal of the target device through a power line; and
a processor module, connected to the power line communication receiver and configured to analyze the communication signal to obtain an analysis result, wherein the processor module is further configured to transmit a target control instruction to a target indoor unit or a target outdoor unit through the power line communication receiver, the target control instruction is configured to control an operation of the target indoor unit or the target outdoor unit.

3. The controller according to claim 2, wherein the controller body component further comprises:
a display configured to display operation information and state information of the air-conditioning unit; and
a keypad configured to receive operation information.

4. The controller according to claim 1, wherein the plug component comprises at least one of:
a two-pin plug component and a three-pin plug component.

5. The controller according to claim 1, wherein the plug component is moved to a target position, and the plug component is fixed by a limit module.

6. The controller according to claim 1, wherein the controller comprises a wired remote controller, the wired remote controller is configured to acquire, through the PLC communication network, communication information transmitted by an air-conditioner indoor unit or an air-conditioner outdoor unit; the wired remote controller is further configured to transmit a preset control instruction to a target indoor unit or a target outdoor unit, the control instruction is configured to control an operation of the target indoor unit or the target outdoor unit.

7. The controller according to claim 6, wherein the controller further comprises a centralized controller and a gateway,
the centralized controller is configured to centrally control the plurality of air-conditioner outdoor units and the plurality of air-conditioner indoor units, or the plurality of air-conditioner outdoor units or the plurality of air-conditioner indoor units to perform a target action according to a control instruction after receiving the control instruction; and
the gateway is configured to connect a preset external device to the PLC communication network to control the air-conditioner outdoor units or the air-conditioner indoor units.

8. The controller according to claim 1, wherein the plurality of air-conditioner outdoor units comprise:
a central outdoor unit configured to provide a network Internet Protocol (IP) address for each network device in the PLC communication network, the network IP address being configured to identify each network device; wherein the central outdoor unit forwards communication data to a target communication device after receiving the communication data transmitted by an air-conditioner indoor unit or an air-conditioner outdoor unit.

9. The controller according to claim 3, wherein processor module is connected to the display and is further configured to control the display to display a content to be displayed; and
the processor is connected to the keypad and is further configured to receive and process operation information transmitted by the keypad and perform a corresponding action according to the operation information.

10. The controller according to claim 9, wherein the operation information transmitted by the keypad is a control instruction which is configured to control an operation of the air-conditioner indoor unit or the air-conditioner outdoor unit.

11. An air-conditioner, comprising a controller of an air-conditioning unit, the air-conditioning unit using a Power line Communication (PLC) to communicate, the air-conditioning unit comprising a plurality of air-conditioner indoor units and a plurality of air-conditioner outdoor units, an operation of the air-conditioning unit being controlled by the controller, and the controller comprising:
a plug component, configured to be plugged into a socket in a preset PLC communication network; and
a controller body component, connected to and arranged on the plug component and configured to receive a communication signal of a target device and transmit the communication signal to a device matching the target device; wherein the target device comprises one of an air-conditioner indoor unit and an air-conditioner outdoor unit;
wherein the controller establishes a communication connection with an air-conditioner indoor unit and an air-conditioner outdoor unit connected to a socket in the PLC communication network after being plugged into the socket, to complete communication networking of the controller; after the communication networking is completed, the controller is transferred to a next socket connected to the PLC communication network to maintain normal communication between the air-conditioner indoor unit and the air-conditioner outdoor unit under the PLC communication network.

12. The air-conditioner according to claim 11, wherein the controller body component comprises:
a power line communication receiver, configured to receive the communication signal of the target device through a power line; and
a processor module, connected to the power line communication receiver and configured to analyze the communication signal to obtain an analysis result, wherein the processor module is further configured to transmit a target control instruction to a target indoor unit or a target outdoor unit through the power line communication receiver, the target control instruction is configured to control an operation of the target indoor unit or the target outdoor unit.

13. The air-conditioner according to claim 12, wherein the controller body component further comprises:
a display configured to display operation information and state information of the air-conditioning unit; and
a keypad configured to receive operation information.

14. The air-conditioner according to claim 11, wherein the plug component comprises at least one of:
a two-pin plug component and a three-pin plug component.

15. The air-conditioner according to claim 11, wherein the plug component is moved to a target position, and the plug component is fixed by a limit module.

16. The air-conditioner according to claim 11, wherein the controller comprises a wired remote controller, the wired remote controller is configured to acquire, through the PLC communication network, communication information transmitted by an air-conditioner indoor unit or an air-conditioner outdoor unit; the wired remote controller is further configured to transmit a preset control instruction to a target indoor unit or a target outdoor unit, the control instruction is configured to control an operation of the target indoor unit or the target outdoor unit.

17. The air-conditioner according to claim 16, wherein the controller further comprises a centralized controller and a gateway,
the centralized controller is configured to centrally control the plurality of air-conditioner outdoor units and the plurality of air-conditioner indoor units, or the plurality of air-conditioner outdoor units or the plurality of air-conditioner indoor units to perform a target action according to a control instruction after receiving the control instruction; and
the gateway is configured to connect a preset external device to the PLC communication network to control the air-conditioner outdoor units or the air-conditioner indoor units.

18. The air-conditioner according to claim 11, wherein the plurality of air-conditioner outdoor units comprise:
a central outdoor unit configured to provide a network Internet Protocol (IP) address for each network device in the PLC communication network, the network IP address being configured to identify each network device; wherein the central outdoor unit forwards communication data to a target communication device after receiving the communication data transmitted by an air-conditioner indoor unit or an air-conditioner outdoor unit.

* * * * *